(12) United States Patent
Masutani et al.

(10) Patent No.: US 6,488,397 B1
(45) Date of Patent: Dec. 3, 2002

(54) LINEAR LUMINOUS BODY AND PRODUCTION METHOD THEREOF AND SCANNER

(75) Inventors: Maki Masutani, Saitama (JP); Minoru Ishiharada, Saitama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/831,759

(22) PCT Filed: Jan. 7, 2000

(86) PCT No.: PCT/JP00/00061
§ 371 (c)(1),
(2), (4) Date: May 14, 2001

(87) PCT Pub. No.: WO00/45203
PCT Pub. Date: Aug. 3, 2000

(30) Foreign Application Priority Data

Jan. 28, 1999 (JP) ......................................... H11-020191
Jan. 28, 1999 (JP) ......................................... H11-020192

(51) Int. Cl.⁷ ............................. F21V 7/04; G02B 6/00; G09F 13/00
(52) U.S. Cl. ...................... 362/551; 362/555; 362/560; 362/800; 427/162
(58) Field of Search ............................... 362/551, 555, 362/560, 800, 26; 427/162, 164, 165; 264/171.12

(56) References Cited

U.S. PATENT DOCUMENTS 3,955,015 A * 5/1976 Ohtsuka et al. ............. 427/163
3,973,058 A * 8/1976 Grover et al. ............... 427/163
4,784,877 A * 11/1988 Trumble ...................... 427/163
4,800,048 A * 1/1989 Bloomfield et al. ........... 264/22
5,339,382 A * 8/1994 Whitehead ................... 385/146
5,542,017 A * 7/1996 Koike ......................... 385/123
5,645,899 A * 7/1997 Unterberger ................. 427/558
5,982,969 A * 11/1999 Sugiyama et al. ........... 385/123
6,139,174 A * 10/2000 Butterworth ................. 362/555
6,169,836 B1 * 1/2001 Sugiyama et al. ........... 385/123

FOREIGN PATENT DOCUMENTS

| JP | 9-61633 | 3/1997 |
| JP | 10-133026 | 5/1998 |
| JP | 11-6918 | 1/1999 |

* cited by examiner

*Primary Examiner*—Alan Cariaso
*Assistant Examiner*—Sharon Payne
(74) *Attorney, Agent, or Firm*—Kanesaka & Takeuchi

(57) ABSTRACT

A linear illuminant system includes a light emerging device composed of a light transmission cylinder and light source coupled to one or both longitudinal ends of the light emerging device, in such a manner that light entered from the light source is emitted from the longitudinal side surface of the light emerging device. At least one strip-shaped reflecting layer is formed by printing along the length of the side surface of the light transmission cylinder. In manufacturing a linear illuminant system, the reflecting layer is formed on the side surface of extruded light transmission cylinder by printing in line with the extrusion molding process of the light transmission cylinder.

11 Claims, 1 Drawing Sheet

LINEAR LUMINOUS BODY AND PRODUCTION METHOD THEREOF AND SCANNER

CROSS REFERENCE TO RELATED APPLICATION

This is a continuation application of PCT/JP99/00061 filed on Jan. 7, 2000.

FIELD OF THE INVENTION

The present invention relates to a linear illuminant system which has good water resistance and good environmental resistance, which requires only a low power for operation, and which is especially appropriate for use in a scanning device. It also relates to a method for manufacturing the linear illuminant system with good productivity and at low cost. Furthermore, it relates to a scanning device comprising the linear illuminant system.

BACKGROUND OF THE INVENTION

Conventional linear illuminant devices include neon tubes, fluorescent tubes and cold cathode tubes. These tubes require high voltages and such power as high as several tens of watts per meter, and also require lighting devices like an inverter, thus those tubes come costly. Where neon tubes and fluorescent tubes are used in a bent form, the advanced technique of skilled glassworkers is required, resulting in an increased cost. Furthermore, these tubes have problems in impact resistance and water resistance.

In order to solve problems described above, optical transmission tubes in the form of a flexible tube filled with a transparent core liquid or a flexible transparent polymer and strands of plastic optical fibers have been proposed. Each of these tubes and strands is designed such that light from a light source enters into the tube through one end thereof to emerge from a side surface area of the tube over a length of several tens of meters. Since this emerging area can be separated from the light source and is free of the risk of breakage, it can be used in water, outdoor, or even in an environment with the risk of explosion. The tubes and strands eliminate cumbersome working such as glass working. So, they are easily manufactured and processed, and are readily applied at necessary sites.

These optical transmission tubes are designed to provide light emergence over a length of several tens of meters. Since the light emergent efficiency at the side surface is low, a high power light source of about 50 to 250 W is required in order to provide a sufficient luminance. Even to provide light emergence over a short length such as several tens of centimeters, these optical transmission tubes require high power light sources just as neon tubes and fluorescent tubes.

One possible measure for increasing the luminance at the side surface area of an optical transmission tube is to corrugate the inner surface of a tubular cladding, and the other is to disperse scattering particles into a core. However, when these measures are taken, light emergence is provided from all over the side surface area of an optical transmission tube and not from a desired direction with a sufficient luminance.

SUMMARY OF THE INVENTION

It is an object of the present invention to provide a linear illuminant system requiring only a low power to produce side luminance with a high directivity, which can be manufactured with good productivity and is compact so that it may be installed at any desired place. Another object of the invention is to provide a scanning device comprising the linear illuminant system.

A further object of the invention is to provide a method for manufacturing the linear illuminant system with good productivity and at low cost.

A linear illuminant system of the present invention consists of a light emerging device composed of a transparent light transmission cylinder, a light source coupled to at least one end of the light emerging device, and at least one strip-shaped reflecting layer formed by printing along the length of the light transmission cylinder, wherein the light transmission cylinder receives light from the light source and emits it from the side surface area thereof.

The linear illuminant system of this invention has the strip-shaped reflecting layer formed along the length of the light transmission cylinder to reflect light passing through the light transmission cylinder. Reflected light forms linear light with high directivity and luminance to emerge from the side surface area opposite to the reflecting layer. Consequently, strong side luminance with sufficient brightness is obtained.

In a method for manufacturing the linear illuminant system of the present invention, the reflecting layer is formed on the side surface of the extruded light transmission cylinder by printing in line with the extrusion molding process of the light transmission cylinder.

In the method of the present invention, by introducing such in-line printing, the reflecting layer of the linear illuminant system can be easily and efficiently formed with good productivity.

A scanning device of the present invention comprises aforementioned linear illuminant.

DETAILED DESCRIPTIONS OF THE PREFERRED EMBODIMENTS

Hereinafter, embodiments of the preset invention will described with reference to the drawings.

Figure 1:
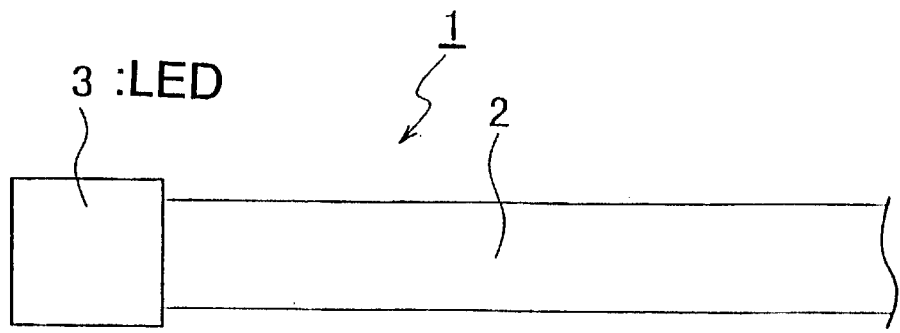
FIG. 1 is a side view of an embodiment of the linear illuminant system of the present invention.
Figure 2:
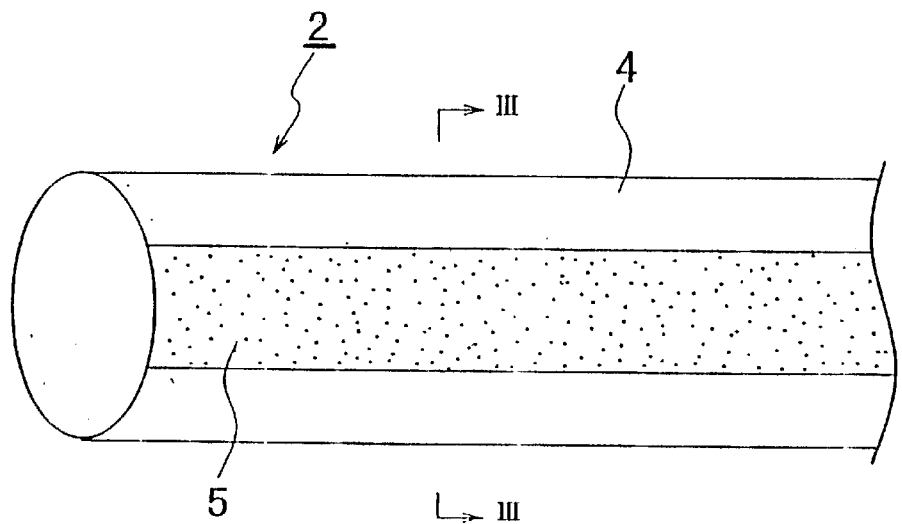
FIG. 2 is a perspective view of the light emerging device.
Figure 3:
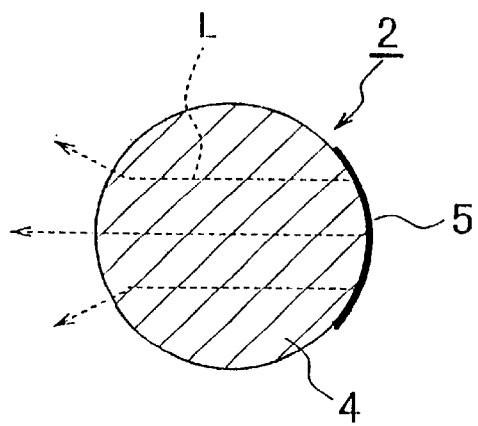
FIG. 3 is a cross sectional view taken along III—III line in FIG. 2.

FIG. 1 is a side view of an embodiment of the linear illuminant system, FIG. 2 is a perspective view of light emerging device, and. FIG. 3 is a cross sectional view taken along III—III line in FIG. 2.

A linear illuminant system 1 of the present invention consists of a light emerging device 2 composed of a transparent light transmission cylinder 4, a light source 3 coupled to at least one end of the light emerging device 2, and at least one strip-shaped reflecting layer 5 formed by printing on the side surface of the light transmission cylinder 4 along the length of the cylinder.

In the present invention, the light transmission cylinder 4 is made of transparent material having a high reflective index, which is suitably selected from materials such that plastic, elastomer and the like. Examples of such transparent materials include polystyrene, styrene-methyl methacrylate copolymers, (meth)acrylic resin, polymethyl pentene, allyl glycol carbonate resin, spirane resin, amorphous polyolefin, polycarbonate, polyamide, polyallylate, polysulfone, polyallyl sulfone, polyether sulfone, polyether imide, polyimide, diallyl phthalate, fluoro-resins, polyester carbonate, resin of norbornene family (ARTON), alicyclic acrylic resin, silicone resin, acrylic rubber, and silicone rubber. The term "(meth)acrylic" means "acrylic and methacrylic".

The reflecting layer 5 is preferably formed of paint including a reflecting material such as a white pigment and scattering agent. Examples of the white pigment and the scattering agent include transparent organic resin particles such as silicone resin particles and polystyrene resin particles, metal oxide particles such as $Al_2O_3$, $TiO_2$ and $SiO_2$, sulfate particles such as $BaSO_4$, carbonate particles such as $CaCO_3$, inorganic compound particles such as pulverized glass and glass balloons, and micro-air cells. These materials may be used alone or in admixture of two or more.

Taking account of reflective efficiency and printability of paint, the white pigment and the scattering agent have preferably a mean particle size of 0.01 to 20 $\mu$m, especially 0.05 to 1 $\mu$m and their content of the reflecting layer is preferably 0.5 to 50% by weight, especially 20 to 40% by weight.

With respect to paint, it may include, as its binder, thermosetting resin such as acrylic resin, urethane resin or epoxy resin, or adhesive classified into acrylics, rubber or elastomer.

The reflecting layer 5 is printed with the aforementioned paint including reflecting materials through a printing process which is preferably in line with the extrusion molding process of the light transmission cylinder. The printing method may be offset printing, gravure printing, letterpress printing, pad printing, screen printing, or inkjet printing.

The width (the length along the side surface) of the reflecting layer 5 formed in such manner as above is preferably not greater than 50% of the circumference of the light transmission cylinder 4, especially not greater than 20%.

When a reflecting layer is too thin, the efficiency of light reflection would be insufficient. When a reflecting layer 5 is too thick, there would be no significant improvement in the efficiency of light reflection in spite of an increased printing cost and a trouble of the layer easily coming off. Therefore, the thickness of the reflecting layer 5 should be determined in consideration of these matters. It is usually about 20 to 200 $\mu$m.

As shown in FIG. 3, light L entered into the light transmission cylinder 4 from the light source is reflected by the reflecting layer 5 formed on the light transmission cylinder 4, and thus intense light with high luminance exits from the side surface area of the light transmission cylinder 4.

The linear illuminant system 1 of the present invention comprising the light transmission cylinder 4 having the aforementioned reflecting layer 5 is particularly useful for a linear illuminant system of a scanning device.

The diameter of the light transmission cylinder 4 of the present invention is not critical. When the linear illuminant system 1 is used for a scanning device, the diameter of the light transmitting cylinder is usually 2 to 20 mm, preferably 3 to 8 mm, and the width (the length along the side surface) of the reflecting layer 5 is preferably not greater than 50% of the circumference of the light transmission cylinder 4, in other words, in the range of 0.1 to 50%, especially in the range of 5 to 20%.

In the present invention, a light emitting diode (LED) is preferably used for the light source. Depending on the intended application, a choice may be made among LEDs emitting light of various colors such as red, blue, green, orange, and white. With respect to the number of LEDs used, a single LED may be used, or plural LEDs may be used to increase brightness. Plural LEDs may be coupled to one end or both ends of the light emerging device 2 so that light enters into the light emerging device 2 from one end or both ends thereof. When light enters into the light emerging device 2 from both ends thereof, more uniform light emergence at high luminance is provided from the side surface of the light emerging device 2.

With respect to the emission color of LEDs, they may emit monochromatic light or a mixture of different colors. For example, when a linear illuminant system of the present invention is used for a black-and-white scanning device, the emission color of LEDs is monochromatic, and for a color scanning device, the emission color of LEDs is a mixture of red, green, and blue.

The LEDs may be continuously or intermittently operated.

In the method for manufacturing the linear illuminant system of the present invention, the reflecting layer 5 is formed by printing on the extruded light transmission cylinder 4 in line with the extrusion molding process of the light transmission cylinder 4.

With respect to the printing, it is preferable to adopt continuous offset printing, gravure printing or pad printing. To use a transfer roll made of rubber or foam having a hardness of not greater than 50° allows the continuous printing on a curved surface and on an uneven surface. The degree of hardness of the transfer roll is more preferably not greater than 40°, most preferably not greater than 35°.

The aforementioned continuous in-line printing makes it possible to form the light transmission cylinder 4 and to print the reflecting layer 5 at the same time, which leads to the increasing of the productivity and the decreasing of the production cost of the linear illuminant system.

The linear illuminant system shown in FIGS. 1–3 represents only one embodiment of the present invention. It is therefore to be understood that the linear illuminant system of the present invention is not limited to the form of the drawings unless the outline of the present invention exceeds.

For example, the light emitting device 2 may be inserted into a transparent resin tube for protection purpose. And the linear illuminant system may be enclosed with a transparent heat shrinkable tube for protecting the light emitting device 2 and providing a seal over the entire structure.

In another case, the embodiment may have two or more reflecting layers to provide two or more strips of light into different directions. In this case, the total length of widths of reflecting layers is preferably not greater than 50% of the circumference of the light transmission cylinder.

A scanning device of the present invention comprises such a linear illuminant system of the present invention, in which the linear illuminant system is fitted to joints of the scanning device with an adhesive or by cramping.

The LEDs are also fitted to the scanning device in the same manner as the linear illuminant system. The connection between lead wire and the LEDs is covered with protective material such as epoxy resin and silicone rubber for providing insulation and preventing penetration of water, water vapor, combustible gas or liquid.

Hereinafter, the present invention will be described in detail with reference to an example and comparative examples.

EXAMPLE 1

A linear illuminant system consisting of a light transmission cylinder made of acrylic resin having 6.0 mm of diameter, and a reflecting layer having 1.0 mm of width (5% of the circumference of the light transmission cylinder) and 100 μm of thickness was prepared in such a manner that the reflecting layer was printed on the light transmission cylinder longitudinally with acrylic paint, which includes 50% by weight of silicone resin particles having 0.4 μm of diameter as reflecting material, by off-set printing in line with the extrusion molding process of the light transmission cylinder.

In the printing, a transfer roll made of rubber having a degree of hardness of 30° was used.

The light transmission cylinder (length: 20 cm) prepared as above was tested as follows: using LED lamps (applied current: 20 MA, light emitting amount: 1 lumen) as the light source, light was introduced into the light transmission cylinder through both ends thereof. Then, the side luminance of the light transmission cylinder was measured on the side opposed to the reflecting layer by a calorimeter (Minolta CS100). As a result, light emergence having high luminance in a range of 50 to 80 cd/m$^2$ was observed along whole the length of the light transmission cylinder.

Comparative Example

A light emerging device was prepared in the same manner as Example 1 except that no reflecting layer was formed. In the same manner as Example 1, light was introduced into the device through both its ends and the side luminance was measured. Observed luminance along whole the length of the device was extremely low and in a range from 5 to 10 cd/m$^2$.

Referential Example

A light emerging device was prepared in the same manner as Example 1 except for using a transfer roll made of rubber having a hardness of 55°. The printing was done unevenly so that the quality of the reflecting layer was not satisfactory.

INDUSTRIAL CAPABILITY

As detailed above, the present invention provides a linear illuminant system allowing strong and directional emergence of light from its side surface area at low power, which can be manufactured with good productivity and is so compact that it may be installed at any desired place. The present invention also provides an efficient scanning device comprising said linear illuminant system.

Furthermore, a manufacturing method of the present invention makes it possible to manufacture such a linear illuminant system with good productivity and at low cost.

What is claimed is:

1. A linear illuminant system comprising:
   a light emerging device composed of a transparent light transmission cylinder,
   light source coupled to one or both longitudinal ends of said light emerging device, and
   at least one strip-shaped reflecting layer formed along a length of said light transmission cylinder so that light entered from said light source into said light emerging device emerges from a longitudinal side of said light emerging device, said reflecting layer being formed by printing with paint including at least one of white pigment and a scattering agent as a reflecting material, an average particle diameter of said reflecting material being 0.01 to 20 μm, an amount of the reflecting material in said reflecting layer being 0.5 to 50% by weight.

2. A linear illuminant system as claimed in claim 1, wherein said reflecting layer has a width not greater than 50% of a circumference of said light transmission cylinder.

3. A linear illuminant system as claimed in claim 1, wherein a thickness of the reflecting layer is 20 to 200 μm.

4. A linear illuminant as claimed in claim 1, wherein the light source is a light-emitting diode.

5. A linear illuminant system as claimed in claim 1, wherein the linear illuminant system is for use in a scanning device.

6. A scanning device equipped with the linear illuminant system as claimed in claim 1.

7. A method for manufacturing a linear illuminant system comprising a light emerging device composed of a transparent light transmission cylinder, a light source coupled to one or both longitudinal ends of said light emerging device, and at least one strip-shaped reflecting layer formed along a length of said light transmission cylinder so that light entered from said light source into said light emerging device emerges from a longitudinal side of said light emerging device,
   wherein the reflecting layer is formed on a side surface of the light transmission cylinder by printing in line with an extrusion molding process of said light transmission cylinder.

8. A method for manufacturing a linear illuminant system as claimed in claim 7, wherein said printing is continuous offset printing, gravure printing or pad printing using a transfer roll made of rubber or foam having a hardness of not greater than 50°.

9. A method for manufacturing a linear illuminant system as claimed in claim 7, wherein said reflecting layer includes at least one selected from a group consisting of metal oxide particles, inorganic compound particles, micro-air cells and transparent organic resin particles as reflecting material.

10. A method for manufacturing a linear illuminant system as claimed in claim 7, a binder for setting the reflecting material included in said reflecting layer is thermosetting resin.

11. A method for manufacturing a linear illuminant system as claimed in claim 7, a binder for setting the reflecting material included in said reflecting layer is adhesive material.

* * * * *